United States Patent
Li et al.

(10) Patent No.: US 9,654,817 B2
(45) Date of Patent: May 16, 2017

(54) SYSTEM AND METHOD TO SYNCHRONIZE VIDEO PLAYBACK ON MOBILE DEVICES

(75) Inventors: Li Li, Bridgewater, NJ (US); Juan Pan, Kearny, NJ (US); Wu Chou, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 665 days.

(21) Appl. No.: 13/527,650

(22) Filed: Jun. 20, 2012

(65) Prior Publication Data

US 2013/0198298 A1 Aug. 1, 2013

Related U.S. Application Data

(60) Provisional application No. 61/591,672, filed on Jan. 27, 2012.

(51) Int. Cl.
| | |
|---|---|
| *G06F 15/16* | (2006.01) |
| *H04N 21/414* | (2011.01) |
| *H04N 21/43* | (2011.01) |
| *H04N 21/6336* | (2011.01) |
| *H04N 21/643* | (2011.01) |

(52) U.S. Cl.
CPC ... *H04N 21/41407* (2013.01); *H04N 21/4307* (2013.01); *H04N 21/6336* (2013.01); *H04N 21/64322* (2013.01)

(58) Field of Classification Search
CPC ....... H04N 21/41407; H04N 21/64322; H04N 21/6336; H04N 21/4307
USPC ............... 709/227–229, 230–236, 204–206, 709/217–219
See application file for complete search history.

(56) References Cited

U.S. PATENT DOCUMENTS

| | | |
|---|---|---|
| 2005/0120292 A1 | 6/2005 | Suzuki |
| 2005/0276397 A1 | 12/2005 | Hiatt et al. |
| 2006/0026290 A1 | 2/2006 | Pulito et al. |
| 2006/0271696 A1 | 11/2006 | Chen et al. |
| 2007/0005725 A1 | 1/2007 | Morris |
| 2008/0163312 A1 | 7/2008 | Faust et al. |
| 2008/0263049 A1 | 10/2008 | Hind et al. |
| 2009/0157861 A1 | 6/2009 | Kakuta et al. |
| 2010/0121971 A1* | 5/2010 | Shao et al. .................... 709/231 |
| 2010/0135278 A1 | 6/2010 | Dingler et al. |
| 2010/0146132 A1 | 6/2010 | Morris |
| 2010/0174789 A1 | 7/2010 | Pena et al. |

(Continued)

OTHER PUBLICATIONS

Li Li, et al., U.S. Appl. No. 13/239,766 Office Action Jul. 25, 2014, Publisher USPTO Published in: US.

(Continued)

*Primary Examiner* — Kenneth R Coulter

(57) ABSTRACT

System and method to synchronize video playback on mobile devices, the method including: receiving, from a first mobile device, a message directed to a second mobile device, the message including an instruction to display a video on the second mobile device; an indication of the time at which the first mobile device sent the message; and a video position of the first mobile device when the message was sent; calculating a delay between the first mobile device and the second mobile device; estimating a video seek time for the second mobile device to seek a video position on the second mobile device; seeking a video position p2 on the second mobile device; and starting display of the video on the second mobile device at video position p2.

20 Claims, 5 Drawing Sheets

(56) References Cited

U.S. PATENT DOCUMENTS

| | | |
|---|---|---|
| 2010/0177812 A1 | 7/2010 | O'Shaughnessy et al. |
| 2011/0208799 A1 | 8/2011 | Labrogere et al. |
| 2011/0302316 A1 | 12/2011 | Chou et al. |
| 2012/0084356 A1* | 4/2012 | Ferdi ............................ 709/204 |
| 2012/0254362 A1 | 10/2012 | Li et al. |
| 2012/0254407 A1 | 10/2012 | Li et al. |
| 2012/0297457 A1 | 11/2012 | Schulte et al. |

OTHER PUBLICATIONS

Li Li, et al., U.S. Appl. No. 13/239,766 Office Action Feb. 12, 2014, Publisher USPTO Published in: US.

Li Li, et al., U.S. Appl. No. 13/239,766 Office Action Jul. 26, 2013, Publisher USPTO Published in: US.

Lauren Lefort, "Review of semantic enablement techniques used in geospatial and semantic standards for legacy and opportunistic mashups", 2009, Austrialasian Ontologies Workshop, pp. 17-26 (10 pages total).

Saeed Aghaee, et al., "Mashup Development with HTML5", Dec. 1, 2010, Mashup '10 ACM, (8 pages total).

Virpi Roto et al., "Navigating in a Mobile XHTML Application", Apr. 5, 2003, New Horizons, vol. 5, Issue 1, pp. 329-336 (8 pages total).

Schulte et al., Support from U.S. Appl. No. 61/413,677 p. 1-2.

Cousins, Joseph M.; Final Office Action; U.S. Appl. No. 13/239,766; Jun. 16, 2016; United States Patent and Trademark Office; Alexandria, Virginia.

"HTTP over XMPP transport" version 0.0.7 Peter Waher, Jul. 9, 2013.

"SOAP over SMPP", version 1.0, Fomo et al. Dec. 14, 2005.

Cousin, Joseph M.; Office Action; U.S. Appl. No. 13/239,766; Jan. 26, 2015; United States Patent and Trademark Office; Alexandria, VA.

Cousin, Joseph M.; Office Action; U.S. Appl. No. 13/239,766; Apr. 28, 2015; United States Patent and Trademark Office; Alexandria, VA.

Cousin, Joseph M.; Office Action; U.S. Appl. No. 13/239,766; Dec. 2, 2015; United States Patent and Trademark Office; Alexandria, VA.

Nguyen, Anoela; Office Action; U.S. Appl. No. 13/239,811; Nov. 20, 2014; United States Patent and Trademark Office; Alexandria, VA.

Nguyen, Anoela; Office Action; U.S. Appl. No. 13/239,811; Jun. 11, 2015; United States Patent and Trademark Office; Alexandria, VA.

Li Li; U.S. Appl. No. 15/014,299; Feb. 3, 2016; United States Patent and Trademark Office; Alexandria, VA.

Nguyen, Angela; Office Action; U.S. Appl. No. 15/014,299; Jun. 3, 2016; United States Patent and Trademark Office; Alexandria, Virginia; United States.

\* cited by examiner

100

200

SYSTEM AND METHOD TO SYNCHRONIZE VIDEO PLAYBACK ON MOBILE DEVICES

CROSS-REFERENCE TO RELATED APPLICATIONS

This application claims the benefit of U.S. Provisional Patent Application Ser. No. 61/591,672, filed on Jan. 27, 2012, the entire content of which is hereby incorporated by reference in its entirety.

BACKGROUND

Field of the Invention

Embodiments of the present invention generally relate to collaborative video sharing, and, in particular, to a system and method for synchronizing video playback on mobile devices.

Description of Related Art

Since the invention of digital cameras, recorded or live streaming digital videos have become an important source of information and knowledge that are widely accessible over the Internet. Combined with various forms of social media, video has become a medium for communication, interaction and collaboration between people. Mobile devices have been developed, including smartphones and tablets, with more computing power, advanced sensory functions, and faster wireless network connections, which offer API for developers to create new applications.

Video conferences that involve more than two participants are available on many mobile devices especially the high-end tablets equipped with cameras. In a conventional video conference, each device receives multiple video streams from the cameras of the other devices. Furthermore, a device can only control its own video views, not those of the other devices.

Social Television (Social TV) is a general term for technology that supports communication and social interaction in either the context of watching television, or related to TV content. Although Social TV incorporates viewer participation, Social TV focuses on how to combine social relations and interactions with TV experience. No known Social TV systems allow the viewer to synchronize TV content across televisions.

Interactive TV (ITV) refers to applications that allow the viewer to control content delivered with and through the television. Although ITV supports playback control on delivered videos, the control actions only apply to one television. In ITV, a viewer's action may influence the content delivered to other viewers, for example by voting. However, such influences are the result of aggregated actions from many viewers instead from one particular viewer.

Some social media web sites support social interactions with and around videos, such as live video streaming (i.e., "live casting") and video sharing (e.g. YouTube), as well as video capturing and sharing on mobile devices. However, none of the known social media web sites that support social interactions with and around videos allow a user to control the playback of a video for a group.

Splitting a high-resolution video stream among two mobile phones arranged side-by-side to form a composed screen is known. Although this system uses protocols and algorithms to synchronize the half frames between the phones, it does not synchronize user playback control across the phones. Moreover, the approach assumes the phones are homogeneous and placed in close proximity.

Prototype systems to support real-time collaborative video annotations on desktop computers are known. In these systems, a group of users can annotate and share their annotations about the videos that they are watching in real-time. However, no method to synchronize playback controls across devices is described.

Google Plus also allows real-time synchronization of shared YouTube videos with its Hangouts tool on mobile phones. A Hangout user can start, stop, mute and un-mute a video and the action will be reflected in all web browsers. However, Google Plus works only for YouTube videos rather than any streaming video source. A further limitation is that the Hangout tool requires a Google Plus account to watch a video and can host only up to nine participants. Furthermore, the Hangout tool depends on a central Google Plus service.

Therefore, a need exists to provide improved collaborative video sharing by use of a system and method for synchronizing video playback on mobile devices, in order to ultimately provide improved customer satisfaction.

SUMMARY

Embodiments of the present invention generally relate to collaborative video sharing, and, in particular, to a system and method for synchronizing video playback on mobile devices, including mobile computing devices and mobile video display devices.

Embodiments in accordance with the present invention provide a real-time collaborative video watching application that allows people in different locations to collaborate in real-time around the same videos played on their mobile devices. Embodiments in accordance with the present invention may be used in many situations and domains in accordance with social and technological trends. For example, embodiments may be used by a virtual project team to listen and discuss a technical presentation.

Embodiments may also be used by a teacher in an interactive virtual classroom to present a subject to the students through a collection of videos. In a multimedia call center, a residence agent could use this application to show customers a recorded video instructions (e.g., how to assemble a faucet). Most current video players support start, stop, pause, resume and seek. More advanced control actions include zoom, pan, and rotate that are useful for watching and/or manipulating playback of 3D videos. Embodiments in accordance with the present invention are able to synchronize to within a predetermined tolerance such video playback on multiple mobile devices while the playback is controlled by one of the devices. With perfect playback synchronization, the participants in different locations will be able to watch the same video on their own devices as if they were watching the video on one device together. For example, a moderator can pause the video to explain a scene and then resume the playback. When this happens, the video displays on all other participating mobile devices may be paused and resumed at the same time as the moderator such that the same video context is always shared among them.

At least a portion of the control actions usable to play recorded videos may also be usable for playing live streaming video. For example, actions such as pause, zoom, pan and rotate may be used to manipulate live streaming video. If the live streaming video is being recorded, then additional actions such as seeking a previous location may be available. In addition, if more than one streaming video feed is provided (e.g., side-by-side, picture-in-picture, etc.), selection from among the available streaming videos may also be controlled by embodiments in accordance with the present invention.

Embodiments in accordance with the present invention provide a system and/or method to synchronize video playback on mobile devices, the method including: receiving, from a first mobile device, a message directed to a second mobile device, the message including an instruction to display a video on the second mobile device; an indication of the time at which the first mobile device sent the message; and a video position of the first mobile device when the message was sent; calculating a delay between the first mobile device and the second mobile device; estimating a video seek time for the second mobile device to seek a video position on the second mobile device; seeking a video position p2 on the second mobile device; and starting display of the video on the second mobile device at video position p2.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
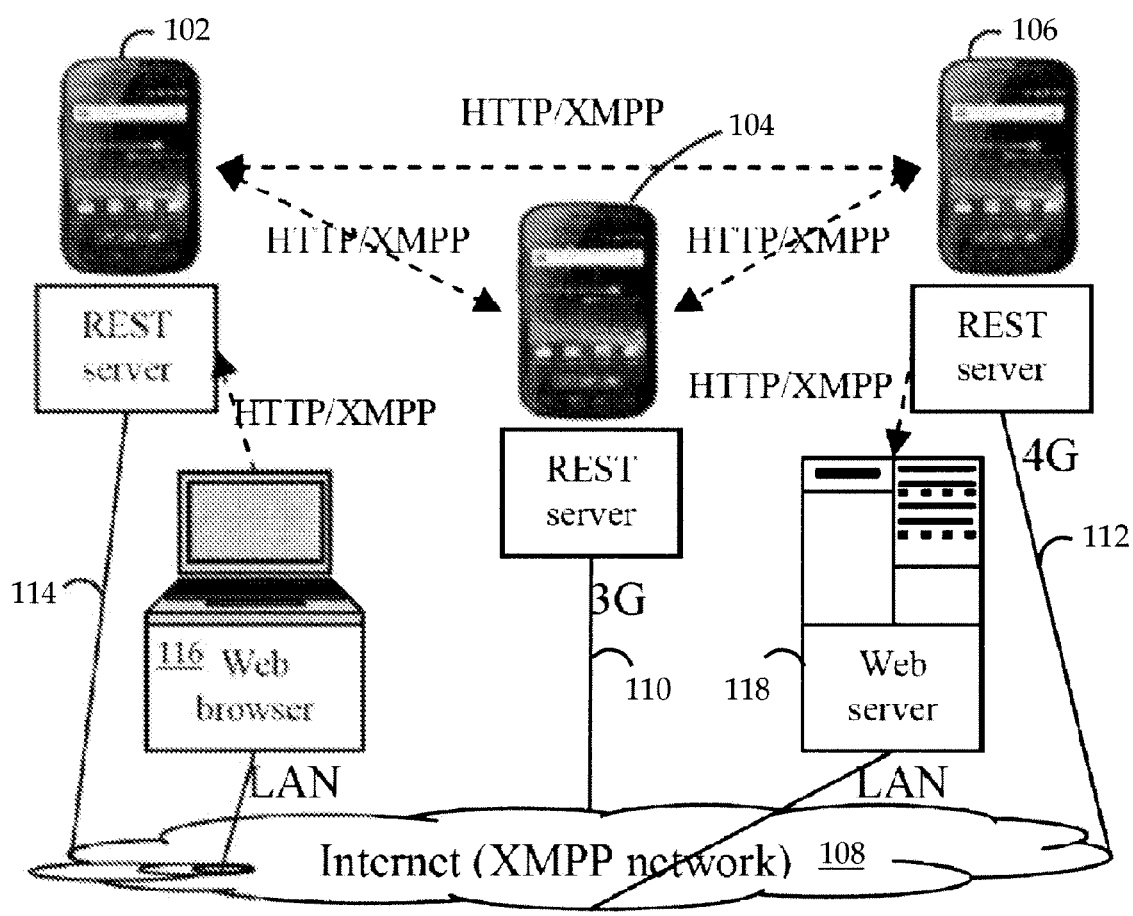
FIG. 1 is a block diagram illustrating a system in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize computing and communication devices to provide synchronized video playback on mobile devices.

The exemplary systems and methods of this disclosure will also be described in relation to computing and video software, modules, and associated computing and video hardware. However, to avoid unnecessarily obscuring the present disclosure, the following description omits well-known structures, components and devices that may be shown in block diagram form, are well known, or are otherwise summarized.

Embodiments in accordance with the present invention provide solutions based on a standard protocol (e.g., REST, XMPP, etc.) for providing communication support, which lessens interoperability problems.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

The terms "switch," "server," "contact center server," or "contact center computer server" as used herein should be understood to include a Private Branch Exchange ("PBX"), an ACD, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting an electrical signal.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

An architectural style that underlies the Web is REpresentational State Transfer ("REST"). A web service that is compatible with REST is said to be "RESTful." Event-based distributed systems using REST services have been studied.

Extensible Messaging and Presence Protocol ("XMPP") is an open-standard communications protocol for message-oriented middleware based on XML. An XMPP network uses a client-server architecture. Every user on the network has a unique Jabber ID ("JID"). To avoid requiring a central server to maintain a list of IDs, the JID is structured like an e-mail address with a username and a domain name or IP address for the server where that user resides, separated by an at sign (@), such as: username@example.com. XMPP is more fully described in RFC3920.

Presence is the availability and willingness of an entity to communicate. It has been used to reduce the uncertainty and cost of communications. XMPP supports efficient bidirectional XML streams between XMPP servers using two TCP/IP connections. This creates bidirectional notification flows between XMPP servers. However, XMPP protocol is not based on REST web services. Although BOSH (XEP-0124) uses HTTP long-polling to emulate bidirectional TCP streams, the established streams are not web resources that can be manipulated by HTTP. XMPP also supports a publish/subscribe extension (XEP-0060) to allow XMPP entities to subscribe and publish events to topics. But these subscriptions are unidirectional and not web resources.

As used herein in connection with embodiments of the present invention, the term "REST" refers to REpresentational State Transfer web services, as described below in further detail. REST provides resource management and promotes architectural choices that include:

1) Addressability—each resource can be addressed by Uniform Resource Identifier ("URI");

2) Connectedness—resources are linked to provide navigations;

3) Uniform Interface—all resources support a subset of a uniform interface between components, namely GET, PUT, DELETE and POST. GET is safe and idempotent (i.e., can be resubmitted if failed without corrupting resource states). PUT and DELETE are not safe but are idempotent.

4) Statelessness—all requests to a resource contain all of information necessary to process the requests, and the servers do not need to keep any context about the requests. Stateless servers are robust and easy to scale. Statelessness induces the properties of visibility, reliability, and scalability. Visibility is improved because a monitoring system does not have to look beyond a single request datum in order to determine the full nature of the request. Reliability is improved because it eases the task of recovering from partial failures. Scalability is improved because not having to store state between requests allows the server component to quickly free resources, and further simplifies implementation because the server does not have to manage resource usage across requests.

5) Layering: intermediate proxies between clients and servers can be used to cache data for efficiency. The layered system style allows an architecture to be composed of hierarchical layers by constraining component behavior such that each component cannot "see" beyond the immediate layer with which they are interacting. By restricting knowledge of the system to a single layer, layering places a bound on the overall system complexity and promote substrate independence. Layers can be used to encapsulate legacy services and to protect new services from legacy clients, simplifying components by moving infrequently used functionality to a shared intermediary. Intermediaries can also be used to improve system scalability by enabling load balancing of services across multiple networks and processors.

As used herein in connection with embodiments of the present invention, the term "RESTful" refers to a web service that is compatible with REST.

As used herein in connection with embodiments of the present invention, the term "R-Event" refers to a RESTful web service framework, and in particular to a RESTful web service framework which is usable to implement distributed event-based systems.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112. The external communication devices 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

Embodiments of the present invention provide a system and method for synchronizing video playback on a plurality of mobile devices, in a way that improves synchronization of the video displays among the devices, allowing for greater certainty of a commonly-shared video experience among the participants. Embodiments in accordance with the present invention may be useful when multiple devices receive a single video source, which can be from the Internet or a local file on the devices, with playback controlled by a control device that can synchronize the video views on all other devices. Embodiments in accordance with the present invention may be complementary to a video conference and may be integrated into the video conference as a special operating mode. Embodiments in accordance with the present invention may be operable in a peer-to-peer configuration. Embodiments in accordance with the present invention may be useful as mobile devices and online videos become more commonplace.

Embodiments in accordance with the present invention may access a video source from a device in a variety of ways. A device may download the video before playback or stream it from the network during playback. Embodiments in accordance with the present invention allow for devices to join and leave a playback session at arbitrary times, i.e., multiple devices do not need to start the video playback at the same time. A session represents a relation between participants who watch the same video. Sequential sessions may include sessions that are arranged in succession.

Embodiments in accordance with the present invention are operable across a variety of device types, device locations and network infrastructure such as the infrastructure of FIG. 1. Devices may have different operating systems and APIs in different programming languages and support different video codecs and playback controls. Devices may be located in the same room with fast and reliable networks (e.g. LAN) or distributed in different places with heterogeneous networks (e.g. 3G and 4G cellular networks).

Embodiments in accordance with the present invention may be independent of the video sources, device types, device locations and network infrastructure. Achieving a high degree of synchronization across a variety of device types, device locations and network infrastructure is difficult in the known art. Even if the devices play the same video in a particular session, they may play the video at different speed because they have different playback engines and network bandwidth. Since the timing and types of video devices used by users cannot be determined in advance, communication between multiple mobile devices is used in order to synchronize to within a predetermined tolerance the video views, i.e., the differences can be corrected by synchronization messages sent to and from the control device. But too many synchronization messages may drain the power of the devices and overwhelm the network. Furthermore, the synchronization messages may take different times to arrive and the message delays may further affect the video synchronization.

Embodiments in accordance with the present invention may be usable with devices that may have different operating systems and/or APIs in different programming languages and/or support different video codes and media controls. Devices may be located in the same room or distributed in different places. They may connect to different networks and move between networks during a collaboration session. Accordingly, there are several challenges to achieve improved view synchronization, such as:

1) The mobiles devices may play the video at different speed because they have different playback engines and network connections. To address this challenge, embodiments in accordance with the present invention predict the expected video locations for one or more of the playback controls;

2) The network latency between the mobile devices is not constant;

3) The devices may join and leave a video session at unpredictable times. A device which has left a video session may rejoin it at a later time; and 4) The clocks in the mobile devices may not be sufficiently synchronized.

To work in different situations, embodiments in accordance with the present invention may be usable with videos that have been downloaded to local devices or streamed from the video source.

Embodiments in accordance with the present invention synchronize video views on multiple mobile devices to within a predetermined tolerance while the video playback is controlled by one of the devices. With improved synchronization of the video views, participants in different locations may be able to watch the same video on their own devices as if they were watching the video on one device together. Video playback on the multiple mobile devices may be controlled by a single control device, such as being able to start, stop, pause, resume, and seek. More advanced video playback control actions may include zoom, pan, and rotate, which may be useful for watching and/or manipulating playback of 3D videos. With these control actions, a moderator at the control device can, for instance, pause the video to explain a scene and then resume the playback. When the moderator controls the video playback, the controlled video displayed on all the participating mobile devices will be synchronized to within a predetermined tolerance (e.g., be paused at approximately the same view and be resumed at approximately the same time), such that the same video context is always shared among the participants at essentially the same time.

To address the issues identified above, embodiments in accordance with the present invention provide a resource-efficient RESTful process and service platform (referred herein as "Cofocus") that exposes (i.e., makes accessible) the media control functions in mobile devices as REST services in a logical peer-to-peer network at a networking layer. At an application layer, a moderator is used to control video playback at controlled devices.

Using this service platform, embodiments in accordance with the present invention provide video synchronization protocols and algorithms to synchronize to within a predetermined tolerance video controls among mobile devices with REST services. In addition, embodiments in accordance with the present invention provide protocols for ad-hoc session management and text chat with end-to-end security to facilitate secure collaboration over heterogeneous networks.

REST as an architectural style of the mobile service platform is advantageous for several reasons. First, REST encourages independent development of components in a distributed hypermedia system with flexibility, usability, simplicity, efficiency, scalability and extensibility. Second, REST services may be integrated more easily with the Web. A mobile device acts as a web server that exposes its functions as REST services. At the same time, the mobile device acts as a web client that accesses the services using the HTTP protocol.

However, conventional REST services suffer from known disadvantages for real-time collaborative applications in a mobile environment as summarized below:

1. A mobile device does not have a reachable IP address to act as a web server, therefore the mobile device cannot accept outside HTTP requests after it connects to the cellular network. Meanwhile, the mobile device often can connect to XMPP servers and clients without a problem. Many mobile devices have an ability to host REST services so that its functions and states can be controlled and observed in real-time. However, REST services on such mobile devices are not usable over an XMPP network because there is no defined way to transport HTTP messages over XMPP;

2. Conventional REST lacks mechanism to support asynchronous message exchange patterns that are important for event-driven applications;

3. The full-fledged HTTP is too resource-intensive for resource-constrained mobile devices; and 4. Conventional REST does not have built-in support for presence which is important in collaborative applications.

To address these issues, embodiments in accordance with the present invention provide a Compact HTTP protocol and binding to XMPP to support peer-to-peer asynchronous interactions between mobile devices.

In this architecture, a REST server is addressable as an XMPP entity identified by a Jabber ID ("JID"). The resources of a REST server are identified by a URI template of the format http://xmpp:{jid}/{path}. Since the REST server is addressable as an XMPP entity, a mobile device can know in real-time when a REST server joins or leaves a collaboration session based on the presence information provided by the XMPP layer about XMPP entities. With this approach, a group of mobile devices can form an ad-hoc collaborative mobile web in which devices can join and leave at random. Compact HTTP and binding of compact HTML to XMPP are described more fully in U.S. patent application Ser. No. 13/239,766 and U.S. patent Ser. No. 13/239,811, both of which are hereby incorporated by reference in their entirety.

FIG. 1 illustrates a small ad-hoc network 100 formed by three mobile devices 102, 104, 106. Each of mobile devices 102, 104, 106 includes a REST server through which the mobile devices 102, 104, 106 of ad-hoc network 100 are able to access the Web, as represented by Internet 108, via wired or wireless interfaces 110, 112 and 114. The dashed arrows indicate messages sent from REST clients to REST servers. Examples of devices connectible to Internet 108 include web browser 116 and web server 118. Web browser 116 can access resources, including accessing ad-hoc network 100, via communication network 108. Elements communicatively coupled to communication network 108 may access exposed resources of ad-hoc network 100.

Ad-hoc network 100 may be adapted to support real-time collaborative video watching in accordance with one or more embodiments of the present invention. Exemplary types of mobile devices 102, 104, 106 may include, without limitation, cellular phones, laptops, Personal Computers (PCs), Personal Digital Assistants (PDAs), digital phones, analog phones, and the like.

Communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

Collaborative Video Watching

Figure 2:
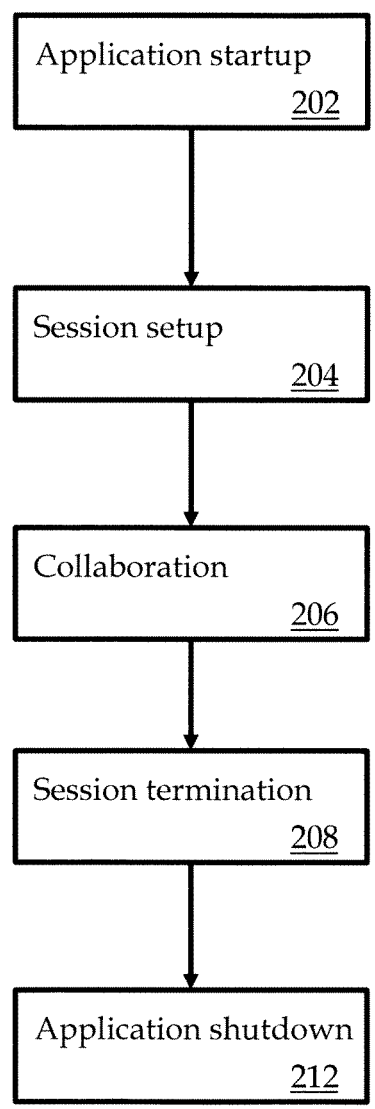
FIG. 2 illustrates at a high level of abstraction a process for collaborative video sharing, in accordance with an embodiment of the present invention.

Referring now to FIG. 2, embodiments of a process 200 in accordance with the present invention include five phases that can be controlled by a moderator through a GUI, in order to give the moderator control over the mobile devices of participants.

Figure 3:
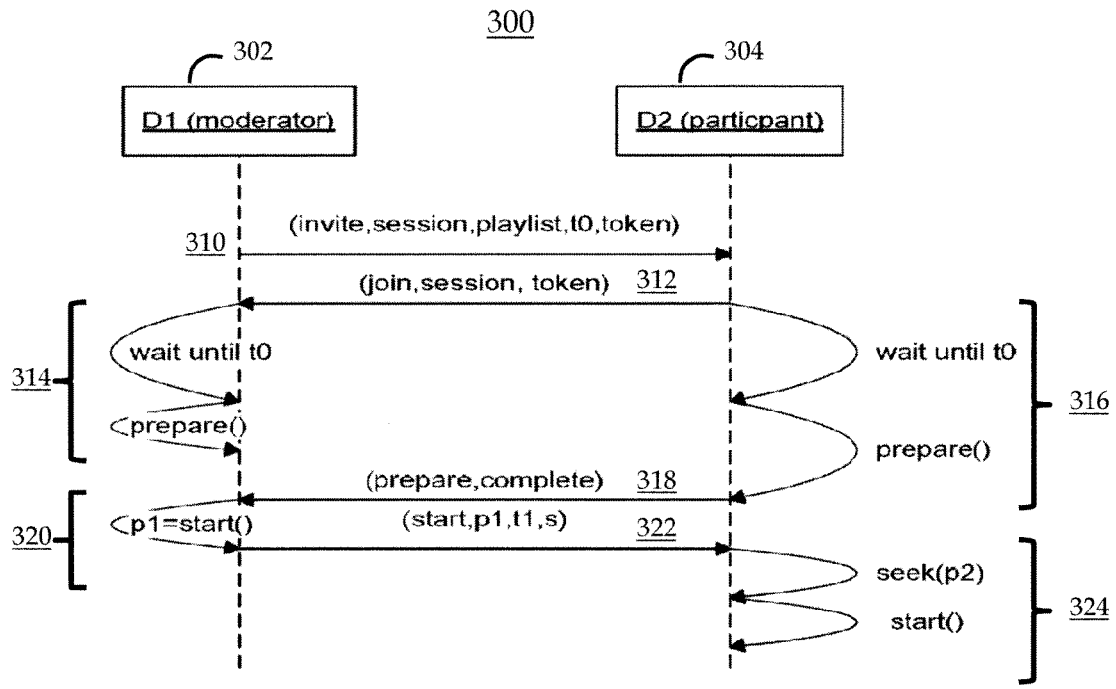
FIG. 3 illustrates steps performed and messages exchanged during session setup, in accordance with an embodiment of the present invention.

Phase 1. Application startup 202, during which a moderator and participants start up REST services on their mobile devices and log into the XMPP network using their JID. An embodiment of message traffic during Application startup 202 is illustrated in FIG. 3.

Figure 4:
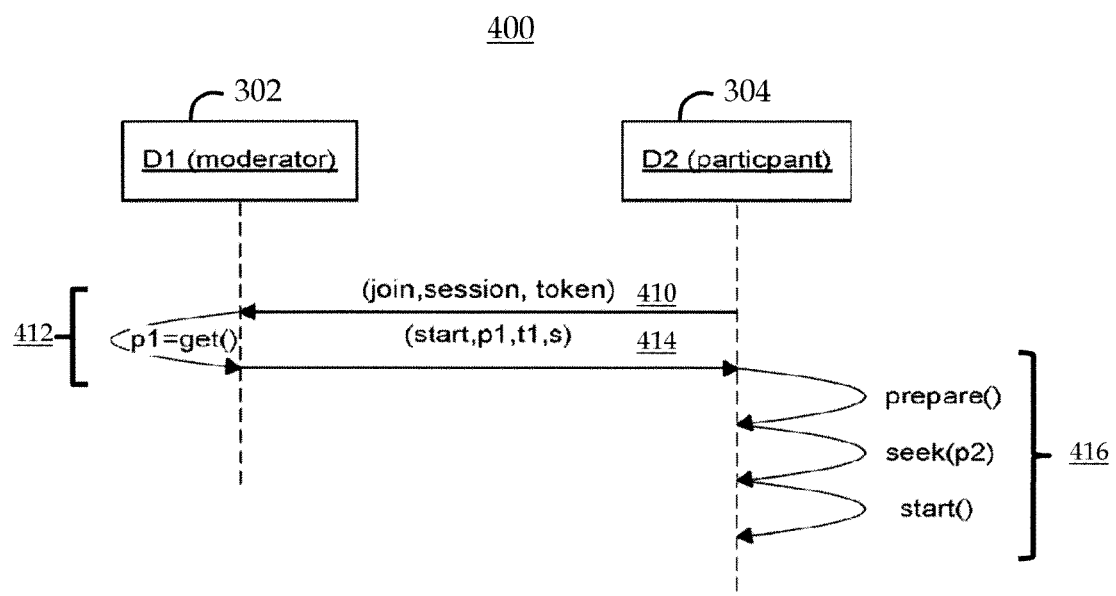
FIG. 4 illustrates steps performed and messages exchanged during mid-session join, in accordance with an embodiment of the present invention.

Phase 2. Session setup 204, during which the moderator invites the participants to join the session. The invite message specifies a video playlist and a scheduled start date/time. Upon receiving the invite message, a participant can join the session right away or wait until a later time. An embodiment of message traffic during Session setup 204 is illustrated in FIG. 4.

Phase 3. Collaboration 206, during which, when the scheduled start date/time occurs, video playback on joined mobile devices will start automatically at the same time. During collaboration 206, the moderator can control the video playback at will, such as pause/resume/seek/reset, and the video views on the participating mobile devices are synchronized automatically to within a predetermined tolerance with a moderator's device. A moderator can also select a different video to play and monitor the video progress on other mobile devices. The moderator device receives periodic position updates from the participant devices, and the moderator's estimate of the received position of the participating device is adjusted by the estimated network delays.

A participant can monitor moderator's video progress in order to estimate how far apart the participant is from the moderator. A participant can join and leave an active session at any time without affecting other participants' video views. Whenever a participant joins, his or her video view will be synchronized automatically to within a predetermined tolerance with the current view of the moderator, by use of the Join process described herein.

Figure 5:
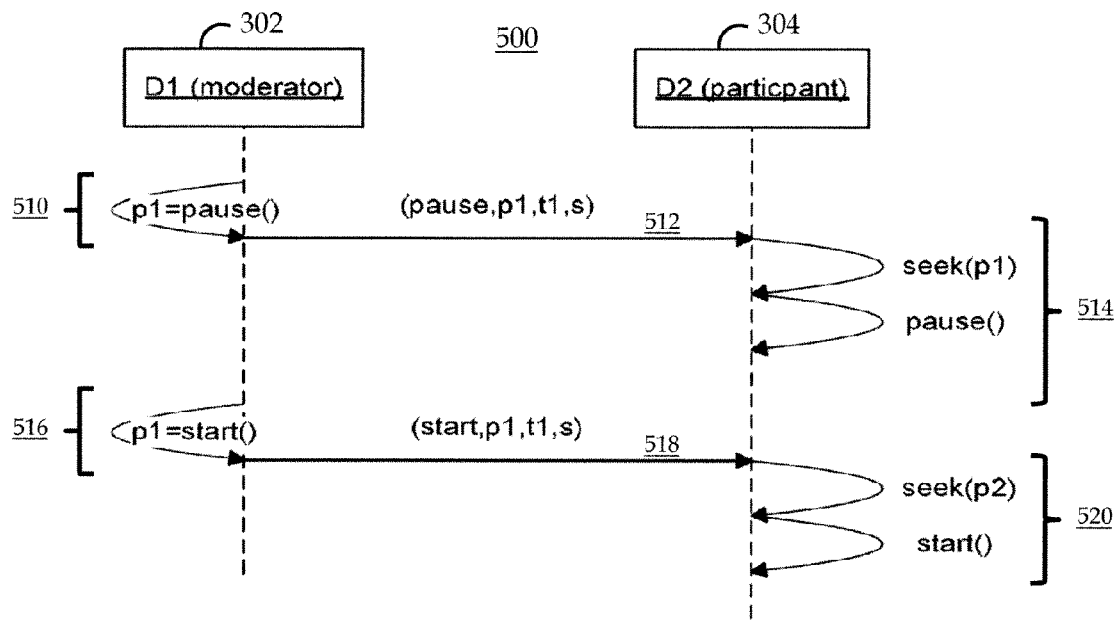
FIG. 5 illustrates steps performed and messages exchanged during a video pause, in accordance with an embodiment of the present invention.
Figure 6:
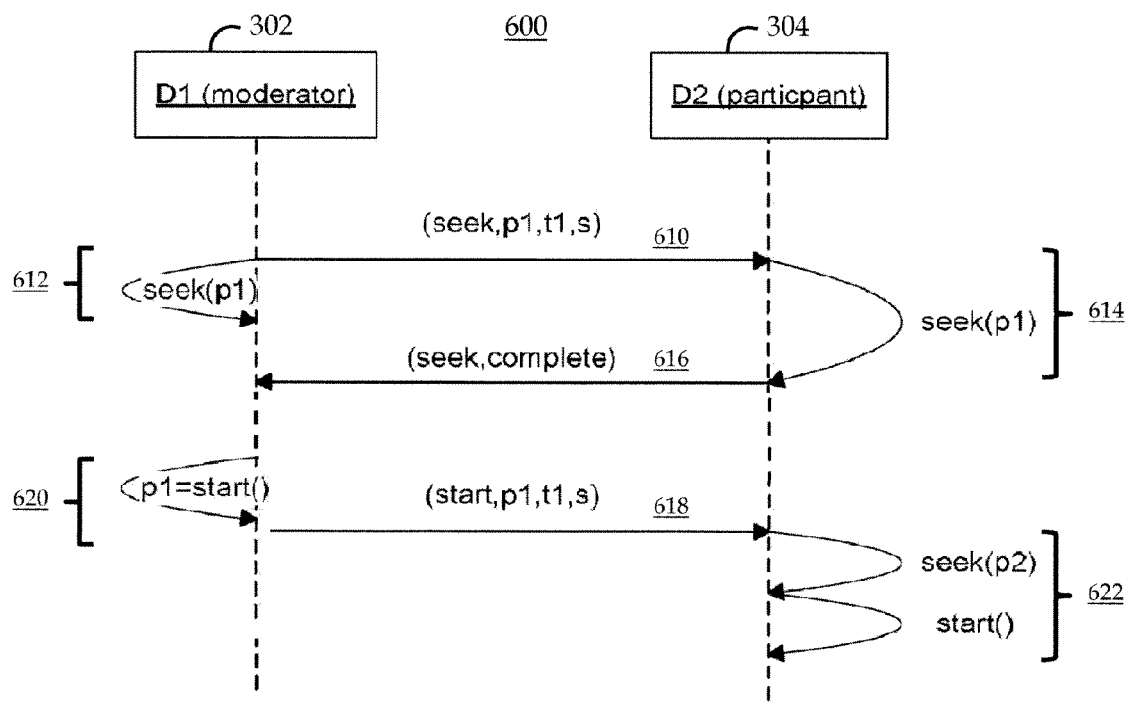
FIG. 6 illustrates steps performed and messages exchanged during seeking a video position, in accordance with an embodiment of the present invention.

Participants and the moderator may also exchange text chat messages. An embodiment of message traffic during Collaboration 206 is illustrated in FIGS. 5 and 6.

Phase 4. Session termination 208, which is configured such that the moderator sends a termination messages to all the invited participants and terminates the session. No participant can join the session during or after session termination 208. Alternatively, the moderator may terminate participation in the session by selected participants, while leaving a session open for other participants.

Phase 5. Application shutdown 212, which is configured such that the moderator and participants log out the XMPP network and stop their REST services. No session can be created after application shutdown 212.

Phases 1 and 5 give the users control over the REST services and the application on their phones for security reasons and power conservation. Phases 2 and 4 allow a moderator to create many sequential sessions within one application. This also increases security as the moderator can secure each session differently, for example with a new security token. For example, embodiments in accordance with the present invention may provide a sequential text chat communication session concurrently with the video playback. If sufficient system resources are available (e.g., communication bandwidth, processing speed, available memory, etc.), then more resource-intensive communication sessions may be provided concurrently with the video playback, such as a concurrent voice call. Video progress bars allow a user to check how far apart the video playbacks are and make necessary adjustment if possible. Video playback progress may be calculated as: position=(current_position)+ (receive_time−send_time)*playback_speed. The moderator may have available or calculate video playback progress for all participants, and all participants may have available or calculate video playback progress for the moderator. Embodiments in accordance with the present invention may provide for participants to see video playback progress of each other.

The video playback synchronization in Session setup 204 may be accomplished in several ways. In one embodiment, video frames across the mobile devices are be synchronized to within a predetermined tolerance to achieve improved alignment of video playback across the mobile devices, by use of low-level access to the video decoders and playback engines on mobile devices. However, low-level access is not known to be available in mobile device APIs that are commercially available. Although APIs and/or other components can be modified if they are open source, a user may have to upgrade their system to use such an application, thereby presenting a barrier to adopting this embodiment. In contrast, some mobile APIs, such as the Android Software Development Kit ("SDK"), offer time-based video playback controls that are adequate for embodiments in accordance with the present invention.

In another embodiment in accordance with the present invention, synchronization messages are exchanged among participating network members. The synchronization messages include information about the playback status of a moderator, such as whether a video is paused or is playing, and a current playback location in the video. The participating, non-moderator members will estimate latency associated with the exchange of synchronization messages, and will adjust their local current playback locations based upon the estimated latency.

Synchronizing events across mobile phones often requires the clocks on the devices to be synchronized such that they have a bounded time drift (i.e., rate of change over time) and/or bounded time difference. The bounded time drift and/or bounded time difference represents a predetermined synchronization tolerance. In one embodiments in accordance with the present invention, the known Network Time Protocol ("NTP") may be used to synchronize clocks on mobile devices. Therefore, embodiments in accordance with the present invention assume that the clocks of the mobile devices are sufficiently synchronized. NTP may be described in one or more of RFC 1305 and/or RFC 5905.

Embodiments in accordance with the present invention utilize a time-based video playback model proposed by Android SDK, which is a well-known model for web based video playback control. In the time-based model, a video file or streaming video is divided into a series of time-based positions that are separated by a predetermined time period (e.g., 1 millisecond apart), or a certain number of frames apart. An effective lower bound on the resolution of the time-based positions may be established by 1/R of the frame rate R. For example, a frame rate of 25 fps may establish an effective lower bound of 40 ms on the time resolution. Each playback control action moves the video from or to one of these positions.

To relate the time positions to video frames in this model, assume the video frame rate on the mobile devices is "R" frames per second ("fps"). This is a reasonable assumption because all devices play the same video. If the frame rate of the moderator changes (e.g., during a fast-forward operation), then the frame rate will change accordingly for all participating devices. If the video on a first mobile device is at time position p1 milliseconds and the video on a second mobile device is at time position p2 milliseconds (with the video positions of devices being exchanged through messages as necessary), then the frame difference between the two mobile devices is $$\left[ \frac{R|p1 - p2|}{1000} \right].$$

Embodiments in accordance with the present invention attempt to reduce the position difference of the video playback on the two devices with a lesser number of messages.

A simple synchronization method with a minimal number of messages is for the participant devices to duplicate the moderator's control actions. This approach ignores the position difference caused by, e.g., network delay. For example, when a moderator pauses at position p1 and the network delay is d>0, then the duplicated pause at a participant will be at p1+d. For R=24 fps and d=600 milliseconds, the participant video view will be 14 frames late which at times may be a completely different image from the moderator's frame. To compensate these delays, a participant device needs to predict the moderator's position based on its current position, playback speed, network delay and execution delay. The network delay occurs when synchronization messages are transmitted between devices and the videos are downloaded to devices over the network. The execution delay occurs when playback control threads take time to complete on a device, and possibly with a non-negligible difference in delay among different devices.

To support position prediction, a moderator's control action is conveyed to a participant by a message formatted as a 4-tuple (a, p, t, s), where "a" is a control action, "p" is the video position related to or to be used for the action, "t" is the timestamp (in millisecond) when the video position "p" is obtained, and "s" is the playback speed which is the number of video positions advanced by a device in one second clock time. If the video playback is slower than real-time, then s<1; if video playback is in fast-forward mode then s>1; and s=1 otherwise. Video playback speed can be estimated by the moderator device for each control action. All participants (including the moderator) receive video from a common source and, by analogy, the moderator is like an orchestra conductor keeping participants in sync.

The playback control actions may be implemented based on the Android SDK. They are executed by the devices in reaction to the user input or synchronization messages listed below. Video positions may be in terms of timestamps or other indicia of position. Playback control actions may include:

prepare( ): prepares the video for playback. For example, a minimum amount of the video may be buffered in a participant device, and the playback engine may initialize its initial states;

start( ): starts the video playback at the current position and returns that position;

pause( ): pauses the video playback at the current position and returns that position;

seek(p): changes the current video position to p; and get( ): returns the current video position.

The following subsections describe the synchronization protocols between a moderator device and a participant device. The protocols can be generalized to multiple participant devices using XMPP group chat service such that the number of messages sent from the moderator device will remain the same when the number of participant devices increases. For clarity, the synchronization HTTP messages between devices are encoded as n-tuple.

A. Scheduled Start

FIG. 3 illustrates a scheduled start process 300, used by a moderator 302 and one or more participants 304 in order to start a synchronized video on a mobile device used by participant 304. Process 300 may be repeated for each participant device 304 that will participate. Process 300 begins when moderator 302 sends INVITE message 310 to participant 304. Message 310 includes parameters that inform participant 304 of a session identifier ("ID"), a playlist, a start time t0 and a security token. Security tokens are used in order to ensure that only devices with the authenticated token can participate in the session. The token is specific to a session, such that all participant devices receiving the session have the same token. The session may contain more than one video.

Participant 304 responds by sending a JOIN request message 312, which includes the session ID and the security token. Concurrently, moderator 302 will wait at step 314 and participant 304 will wait at step 316, until start time t0, t0 being the scheduled start time of the playback decided by the moderator.

At time t0, moderator 302 prepares to send the video and participant 304 prepares to receive the video. When the scheduled time t0 occurs, all participating devices 304 prepare the video playback buffer automatically. Preparation may include loading into a memory buffer at least a predetermined segment of the video starting at the playback location, and the playback engine initializing some internal states that are specific to that engine. Some embodiments in accordance with the present invention may prefetch all or some of a video upon receipt of the INVITE 310 message, then send the "(prepare, complete") message 318 at any point prior to or at t0.

When participant 304 has finished preparing, preparation complete message 318 is sent from participant 304 to moderator 302. The preparation complete message 318 informs the moderator 302 that the participant device 304 has finished the preparation of video playback. When all the participant devices 304 are ready, the moderator device 302 starts the playback for itself and the participant devices 304. This two step approach reduces the preparation variations in the mobile devices.

At step 320, moderator 302 prepares to send a start command 322 to participant 304. Start command 322 is then sent to participant 304, the start command 322 including parameters p1, t1 and s, wherein "p1" is a start position in the video to be played, as commanded by moderator 302, "a" is the time stamp corresponding to p1, and "s" is the frame rate of the video. "a" is used to calculate message latency to predict new video position for the participant. Embodiments in accordance with the present invention assume that all devices can play back the video at the same rate.

At step 324, participant 304 has received the start command 322. Participant 304 will then calculate its own start position p2 based upon p1 received from moderator 302 as adjusted for delays calculated or estimated by participant 304. Participant 304 will then seek the video location indicated by p2 and start playback at point p2 on the device of participant 304.

For example, if on the moderator device 302 the video playback location is at video position p1 corresponding to timestamp t1, then the delay (in milliseconds) for participant 304 to process this control includes: 1) execution delay "d1" at moderator device 302 to send the control message; 2) network delay "d12" between moderator device 302 and participant 304; 3) execution delay "d2" at participant 304 to receive the control message. To compensate these delays, participant 304 should start its playback of the video at video position $p2=p1+s(d1+d2+d12)/1000$. This means participant 304 has to seek forward to video position p2, with the video seek operation itself having a delay "ds" that should also be compensated. Under ordinary circumstances, delays d1 and d2 are relatively insignificant in comparison with other delays, so delays d1 and d2 can ordinarily be ignored. If participant 304 receives the control message at timestamp t2, then $d12=t2-t1$. With these adjustments, the predicted video position at participant 304 is $p2=p1+s(ds+t2-t1)/1000$, where ds is estimated by participant 304, and p1, p2 and ds are in milliseconds ("msec").

The delay ds may be a function of a difference between the current video playback location of participant 304 and the calculated video position p2. For example, a small difference will produce a small delay ds, but a large difference will produce a relatively larger delay ds.

Calculations of delays, video positions, other numeric quantities, and formatting of video displays may be carried out by use of one or more processors coupled to a memory, the memory configured to store software instructions which, when the software instructions are carried out by the one or more processors, will perform the calculations of delays, video positions, other numeric quantities and formatting of video displays.

B. Midway Join

FIG. 4 illustrates a midway join process 400, used by moderator 302 and participant 304 in order to allow participant 304 to join the video session after playback is already in progress. The participant device 304 sends a join request to the moderator device 302 and the moderator device 302 responds with a start tuple. The participant device 304 calculates its position in a way similar to the calculation for a scheduled start, except that the participant device 304 has to compensate for the video prepare time "dp," which is estimated by the participant device 304. So the estimated video start position on the device of participant 304 is $p2=p1+s(dp+ds+t2-t1)/1000$.

Midway join process 400 begins with JOIN message 410 from participant device 304 to moderator 302. Message 410 further includes a session ID and security token. At step 412, moderator 302 determines its position p1 via a "get( )" command, and the position p1 is communicated to participant 304 via START message 414. START message 414 may further include parameters "t1" (time position) and "s" (playback speed, in fps). At step 416, participant 304 will prepare for video playback (e.g., by buffering at least a portion of the video playback), and will calculate a playback position p2 on the device of participant 304. Participant 304 will then begin playback at the calculated position p2.

C. Pause/Resume

FIG. 5 illustrates a pause and resume process 500, used by moderator 302 and participant 304 in order to allow moderator 302 to pause the video session after playback is already in progress, and then later to resume a paused playback. The moderator can pause and resume a video at any time. A paused video may also be stopped. Pausing a video will preserve system resources (e.g., memory allocation, playback state, etc.) so that the resources may be used when the video plays again. In contrast, stopping a video releases system resources so that the system is able to play another video. Whenever the moderator pauses its video playback, a participant should pause its video playback and seek backward to the estimated position at which the moderator paused the video on the moderator's device. When the participant resumes, a start tuple is sent from the moderator to the participant, which starts its playback at a position that is calculated similarly to the case of a midway join.

Process 500 may omit depiction of certain events, like exchange of a security token, so as not to unduly obscure the nature of the process. Pause and resume process 500 begins at step 510, at which a user of moderator terminal 302 issues a pause command at playback position p1. A pause message 512 is transmitted to the terminal of participant 304. Because of delays, participant 304 may receive message 512 at a later time or position than p1. Therefore, at step 514, participant 304 may seek playback position p1 and then may pause their video playback at p1. So when a pause command is received on the participant side, the participant may see the video jump backwards by an amount of (p2−p1), with "p2" as discussed below.

At a later time, moderator 302 at step 516 issues a start command in order to start the playback of the video starting at the location where the playback was paused. If the moderator wishes to resume playback at a different location than where the vide was paused, then the seek process of FIG. 6 may be used. The playback position p1 of moderator 302 is retrieved and communicated to the participants 304 by way of a START command 518. The start command 518 may also include timestamp t1 and playback speed s. At step 520, participant 304 seeks a position p2 in the video playback stream, the position p2 calculated from the starting location p1 of moderator 302 plus estimated delays involved in communicating and processing the START command 518.

D. Seek

FIG. 6 illustrates a seek process 600, used by moderator 302 and participant 304 in order to allow moderator 302 to seek forward or backward to any position and to have the video playback start automatically from that position. Process 600 may omit depiction of certain events, like exchange of a security token, so as not to unduly obscure the nature of the process. The moderator has stopped playback of a video before the start of seek process 600. Ordinarily, seek process 600 may take a noticeably long time to complete depending on the target position and the video streaming speed. The apparent time to perform seek process 600, as perceived by moderator 302 and/or participant 304, may be reduced by having moderator 302 first instruct participant 304 by way of SEEK command 610 to seek a desired video start position designated as "p1." Sending SEEK command 610 may reduce an apparent wait time because, when the start command is received, the participant has to jump forward only by (p2−p1), and this jump will be quicker than if the participant had to seek position p2 from some farther-away location. The seek operation is similar to the prepare operation.

Upon sending of SEEK command 610, moderator 302 at step 612 will seek the desired video start position p1. Upon receiving of SEEK command 610, participant 304 at step 614 will seek the desired video start position p1. A video is not playing at this point, so it is not necessary to estimate or account for delays in the transmission or processing of the SEEK command 610.0020 When participant 304 positions itself to video position p1, participant 304 will send a SEEK complete message 616 to moderator 302.

Upon receipt of SEEK complete message 616, moderator 302 at step 620 may initiate a start operation. Moderator 302 may then send a START command 618 to participant 304 in order to have participant 304 begin its video playback. The START command 618 includes as parameters position p1, time stamp t1, and playback speed s. A delay between SEEK 616 and START 618 may be used by the moderator in order to wait for all participant to respond to the seek message.

Upon receipt of START command 618 by participant 304, participant 304 at step 622 will seek position p2 within its video playback, p2 being calculated from p1+estimated time delays, as described earlier herein. Participant 304 will start its video playback when position p2 has been found.

V. Security

A mobile device may contain personal and confidential information. Therefore a collaborative application should have a security mechanism in order to protect the personal and confidential information. Embodiments in accordance with the present invention rely upon security mechanisms in the network, service and application layers.

In the network layer, embodiments in accordance with the present invention may use security mechanisms included in the XMPP protocol to authenticate XMPP entities and authorize message exchanges. XMPP accounts may be protected by passwords in order to prevent unauthorized access and JID spoofing. An XMPP entity may elect to receive messages only from its trusted buddy list to reduce the risk of attacks. XMPP messages may also be encrypted with Transport Layer Security ("TLS") as known in the art to ensure confidentiality.

In the service layer, embodiments in accordance with the present invention (e.g., the Cofocus platform) allow a user to specify user-based access polices on their device in order to prevent unauthorized access. Mobile devices also support symmetric key encryption for end-to-end message encryption in case some XMPP servers do not support TLS or the message traverses different networks.

In the application layer, security tokens are used for session startup and session join in order to ensure that only devices with the authenticated token can participate in the session.

VI. Implementation and Experiments

Figure 7:
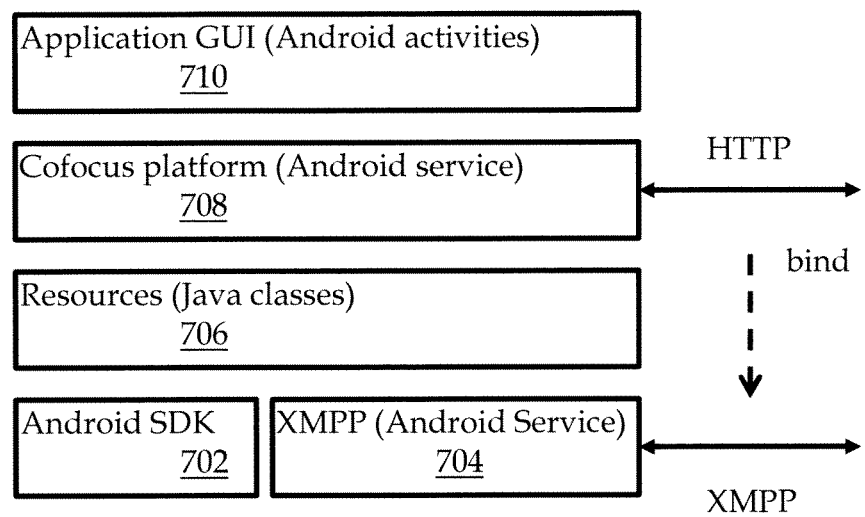
FIG. 7 illustrates at a high level of abstraction a software architecture, in accordance with an embodiment of the present invention.

FIG. 7 illustrates at a high level of abstraction a prototype system 700 in accordance with an embodiment of the present invention. System 700 implemented embodiments of the architecture and synchronization protocols described herein, and had been implemented as an Android application and tested on two Google Nexus S 4G phones running Android SDK 2.3. The phones subscribed to the Sprint 3G cellular networks and connected to the public Google Talk XMPP server (talk.google.com).

System 700 included low-level services provided by Android SDK 702 and XMPP (Android Services) 704. The low-level services were used by Resources (Java classes) 706, which in turn provided the foundation for Cofocus platform (Android services) 708. At the highest level, Application GUI 710 (Android activities) provided the user interface. System 700 included GUI classes that interacted with the REST resources managed by the Cofocus platform. The resources controlled the media player and managed sessions based on the HTTP messages sent over the XMPP transport. Publicly-available videos were used for testing purposes.

Application GUI 710 included or may include several displays useful for presenting information to a user, or inputting information or commands from a user. For example, Application GUI 710 may include a Start Service screen, in which a user may login into an XMPP server, view an invitation to join a video presentation, view status (e.g., signal strength, battery power and/or life remaining, time, etc.) and so forth. Each user is capable of becoming a moderator. Once a moderator is selected, their interface is different from those of the participants.

Application GUI 710 may further include a login screen, in which a user logging into the service may specify parameters such as user name, password, host/port number, service to use, and so forth.

Application GUI 710 may further include a display of list of videos that have been scheduled for collaborative video play on a participant's mobile device. The display may further include the scheduled date and time, URL and/or XMPP addresses of the video source(s), a list of videos that may have been scheduled but are not available, and so forth.

Application GUI 710 may further include a display of information related to one or more videos that are available for collaborative video play, and a command input for joining one or more of the available videos.

Application GUI 710 may further include a video display screen, in which the collaboratively-displayed video is displayed. The video display screen may further include information about the video being displayed (e.g., URL and/or XMPP address), identity of the person logged in, and various user controls related to playback and/or communication. Playback controls for a participant may include at least a control to show progress, opening a chat window, and to exit. Playback controls for a moderator may include at least controls for playing a video, pausing a video, stopping a video, resetting a video, showing progress, opening a chat window, and so forth.

Application GUI 710 may further include a chat window configured to let a user (either a moderator or a participant) send chat messages to another user. The chat window may further include other information useful to display the identity or status of either the video being displayed, the user (e.g., login identity), or of the device itself (e.g., signal strength, batter power, etc).

Application GUI 710 may further include a screen configured to display member video progress. The progress may be displayed in units of frame position, time position, etc. The form of the display may include a bar graph, percentage completion, and so forth. Progress may be displayed for the user and/or other users. An ability to display progress of other users may be limited to moderators. The screen display may further include other information useful to display the identity or status of either the video being displayed, the user (e.g., login identity), or of the device itself (e.g., signal strength, batter power, etc).

One experiment performed using prototype system 700 evaluated the worst-case delay when the video playback was moved forward and backward at random. In this experiment, the synchronization completion time dc=te–ts was measured, where "ts" was the time when a control action was received at the moderator device and "te" was the time when the corresponding seek was completed on the participant device. The test MPEG 4 video was 26 minutes long and 64 MB in size.

One hundred and fifty-four seek operations alternating between locations near the start of the test streamed video and locations near the end of the test streamed video were performed and the statistics of the completion time are summarized in Table 1. Q1 and Q3 are first and third quarter percentiles, respectively.

TABLE 1

| Statistics | Synchronization completion time (millisecond) |
|---|---|
| Q1 | 10239 |
| MIN | 8445 |
| MEAN | 11547 |
| MAX | 15815 |
| Q3 | 12728 |
| STDEV | 1666 |

The experiment shows that on average, it took about 11 seconds to complete the synchronization when the video playback moved across positions that were 26 minutes apart. The synchronization time was about 0.7% of video duration for the seek control based on this experiment.

Figure 8:
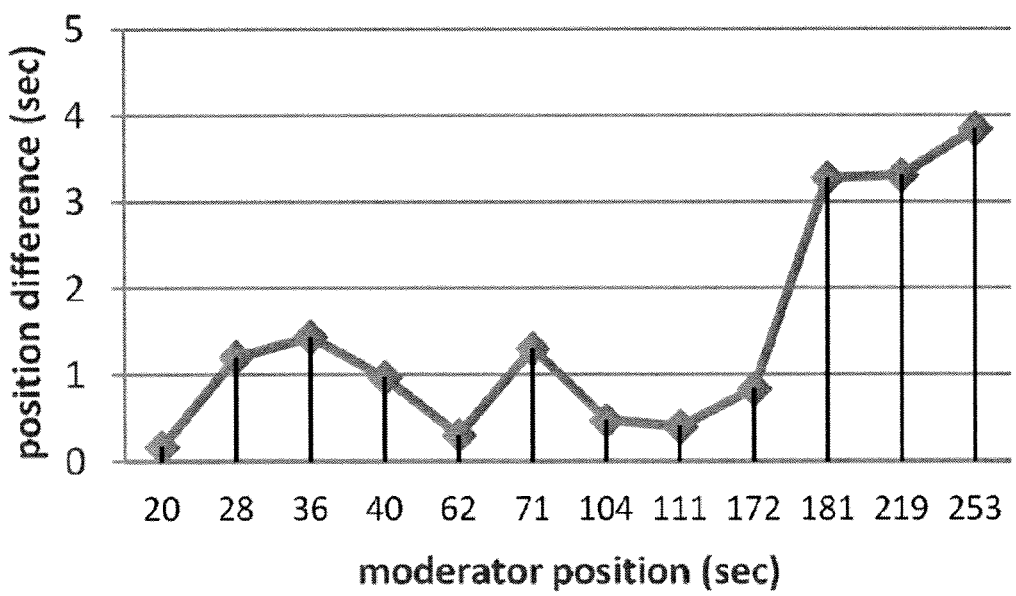
FIG. 8 illustrates experimentally-determined time differences, in accordance with an embodiment of the present invention.

Another experiment involving prototype system 700 measured the video synchronization over the course of playback actions. In this experiment, during the video playback, the moderator alternated pause and resume 6 times (12 actions). After each action, the current video positions on the two phones were read from a screen of Application GUI 710 (e.g., a video progress screen), which received position updates from the participants at one second intervals. FIG. 8 illustrates the position differences between the two phones over time, where the average difference is 1.4 seconds.

Embodiments of the present invention include a system having one or more processing units coupled to one or more memories. The one or more memories may be configured to store software that, when executed by the one or more processing unit, allows for synchronization of video playback on mobile devices, at least by use of embodiments of processes, apparatus and systems described herein, including at least in FIGS. 1-10, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term one or similar language is used. Further, the terms any of followed by a listing of a plurality of items and/or a plurality of categories of items, as used herein, are intended to include "any of," "any combination of," "any multiple of," and/or any combination of multiples of the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method to synchronize video playback among a first mobile device and a second mobile device, each mobile device comprising a respective processor and a respective memory with instructions executable by the respective processor, the instructions when executed by the respective processor performing the steps of:
   receiving, from the first mobile device, a message directed to the second mobile device, the message comprising:
      an instruction to display a video on the second mobile device;
      an indication of a time at which the first mobile device sent the message; and
      a video position of the first mobile device when the message was sent;
   calculating a delay between the first mobile device and the second mobile device;
   estimating a video seek time for the second mobile device to seek a video position on the second mobile device;
   seeking the video position on the second mobile device in accord with the following relationship:

$p2=p1+s(ds+d)/1000$; and starting display of the video on the second mobile device at video position p2, wherein:
      p1=the video position of the first mobile device;
      p2=the video position of the second mobile device;
      d=the calculated delay (msec);
      ds=the estimated video seek time (msec); and
      s=a video frame rate.

2. The method of claim 1, wherein the delay is calculated in accord with the following relationship:

$d=t2-t1$, wherein:

t1=the time at which the first mobile device sent the message (msec); and
   t2=a time at which the second mobile device received the message (msec).

3. The method of claim 2, wherein the delay further comprises a time delay for the second mobile device to prepare to play the video.

4. The method of claim 1, further comprising:
   controlling the video playback on the second mobile device in synchrony with the first mobile device, by use of the first mobile device.

5. The method of claim 4, wherein the step of controlling comprises pausing the video playback on both the first mobile device and the second mobile device.

6. The method of claim 4, wherein the step of controlling comprises manipulating 3D control actions of a 3D video.

7. The method of claim 1, wherein the first mobile device and the second mobile device are in a peer-to-peer networking relationship.

8. The method of claim 1, further comprising: receiving the message from the first mobile device in XMPP format, the message comprising an HTTP message bound to XMPP.

9. The method of claim 8, wherein the HTTP message accesses RESTful services within the second mobile device.

10. The method of claim 1, further comprising: synchronizing a clock in the second mobile device with a reference standard by use of an NTP protocol.

11. A system to synchronize video playback on mobile devices, comprising:
   a receiver on a second mobile device, the receiver configured to receive, from a first mobile device, a message directed to the second mobile device, the message comprising:
      an instruction to display a video on the second mobile device;
      an indication of a time at which the first mobile device sent the message; and
      a video position of the first mobile device when the message was sent;
   a clock configured to record a time the second mobile device received the message;
   a processor coupled to a memory, the memory storing instructions executable by the processor, the instructions when executed by the processor operable:
      to calculate a delay between the first mobile device and the second mobile device;
      to calculate an estimated video seek time for the second mobile device to seek a video position on the second mobile device;
      to seek the video position on the second mobile device in accord with the following relationship:

$p2=p1+s(ds+d)/1000$; and to start display of the video on the second mobile device at video position p2, wherein:
         p1=the video position of the first mobile device;
         p2=the video position of the second mobile device;
         d=the calculated delay (msec);
         ds=the estimated video seek time (msec); and
         s=a video frame rate.

12. The system of claim 11, wherein the delay is calculated in accord with the following relationship:

$d=t2-t1$, wherein:

t1=the time at which the first mobile device sent the message (msec); and
   t2=the time at which the second mobile device received the message (msec).

13. The system of claim 12, wherein the delay further comprises a time delay for the second mobile device to prepare to play the video.

14. The system of claim 11, wherein the processor is further configured to exercise control of the video playback on the second mobile device in synchrony with the first mobile device, by use of the first mobile device.

15. The system of claim 14, wherein the control comprises an ability to pause the video playback on both the first mobile device and the second mobile device.

16. The system of claim 14, wherein the control comprises an ability to manipulate 3D control actions of a 3D video.

17. The system of claim 11, wherein the first mobile device and the second mobile device are in a peer-to-peer networking relationship.

18. The system of claim 11, further comprising: a receiver configured to receive the message from the first mobile device in XMPP format, the message comprising an HTTP message bound to XMPP.

19. The system of claim 18, wherein the HTTP message accesses RESTful services within the second mobile device.

20. The system of claim 11, wherein the clock in the second mobile device is synchronizable with a reference standard by use of an NTP protocol.

* * * * *